United States Patent
Hall et al.

(10) Patent No.: US 7,104,180 B2
(45) Date of Patent: Sep. 12, 2006

(54) LOW NOISE LINEAR ACTUATOR

(75) Inventors: Andrew F. Hall, Dayton, OH (US);
Mike W. Hilton, Dayton, OH (US);
Jason A. McClelland, Xenia, OH (US);
Vincent Guy Pichon, Blois (FR); Scott Alan Stacey, Centerville, OH (US);
Steven K. Raypole, Tipp City, OH (US); Todd J. Brinkman, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/981,148

(22) Filed: Nov. 4, 2004

(65) Prior Publication Data

US 2005/0166749 A1 Aug. 4, 2005

Related U.S. Application Data

(60) Provisional application No. 60/517,000, filed on Nov. 4, 2003.

(51) Int. Cl.
*F16F 9/348* (2006.01)
(52) U.S. Cl. ........................ 91/422; 92/181 R
(58) Field of Classification Search .............. 91/422; 92/181 R, 181 P
See application file for complete search history.

(56) References Cited

U.S. PATENT DOCUMENTS

| | | | | | |
|---|---|---|---|---|---|
| 4,484,669 A | * | 11/1984 | Kato | ................ | 188/282.6 |
| 4,624,347 A | * | 11/1986 | Mourray | ................ | 188/322.15 |
| 5,332,069 A | * | 7/1994 | Murakami | ................ | 188/282.6 |
| 5,529,154 A | * | 6/1996 | Tanaka | ................ | 188/282.6 |
| 6,053,486 A | * | 4/2000 | Schuitema et al. | ...... | 188/282.5 |
| 6,247,563 B1 | * | 6/2001 | De Carbon et al. | ...... | 188/282.5 |
| 6,749,035 B1 | * | 6/2004 | Bundy | ................ | 180/41 |

\* cited by examiner

*Primary Examiner*—Thomas E. Lazo
(74) *Attorney, Agent, or Firm*—Jimmy L. Funke

(57) ABSTRACT

A linear actuator system including a cylinder, a piston slidably received within the cylinder and defining a piston chamber and a rod chamber in the cylinder, wherein the piston includes a plurality of orifices therethrough that place the piston chamber and the rod chamber in fluid communication, and a sealing member movable between a closed position, wherein the sealing member restricts fluid flow through at least one of the plurality of orifices, and an open position, wherein the sealing member is less restrictive of fluid flow through the orifices. The plurality of orifices may include an always-open orifice that is not blocked by the sealing member when the sealing member is in the closed position.

23 Claims, 9 Drawing Sheets

LOW NOISE LINEAR ACTUATOR

This application claims priority to U.S. Provisional Patent App. No. 60/517,000 filed on Nov. 4, 2003, the entire contents of which are hereby incorporated by reference.

BACKGROUND

The present invention is directed to hydraulic suspension systems and, more particularly, to linear actuators for hydraulic suspension systems.

Automobiles, including trucks and sport utility vehicles, as well as other motor vehicles, incorporate suspension systems designed to minimize the leaning or "rolling" of the vehicle body relative to the frame or wheels that occurs when the vehicle corners or turns at relatively high speeds.

FIG. 1. illustrates a typical suspension system, generally designated 10, that includes a pump 14 driven by a motor 12 that draws hydraulic fluid from reservoir 16 through supply line 18. The output of pump 14 is conveyed through line 20 to manifold 22. Fluid flow is split at 24 and is further conveyed through line 26 to power steering manifold 28 and along lines 30, 70 to solenoid valves 32, 34.

Lines 36, 38 extend from solenoid valve 32 and are in fluid communication with rod chamber 40 and piston chamber 42, respectively, of front actuator 44. Lines 46, 48 extend from solenoid valve 34 and are in fluid communication with rod chamber 50 and piston chamber 52, respectively, of rear actuator 54. Fluid supply lines 64, 66 are connected to enable valve 32 to supply fluid to lines 46, 48, respectively, and thereby pressurize rear actuator 54 at the same time as the front actuator 44.

Line 56 is connected to a pressure control valve 58 and a relief valve 60 that, in turn, are connected to line 62, which returns fluid to the reservoir 16. Lines 68, 70 connect valves 32, 34 to return line 62 and supply line 30, respectively.

A controller (not shown) actuates valve 32 to displace its spool from the position shown in FIG. 1, thereby opening lines 36, 38 to receive pressurized fluid from line 30, pressurizing rod chamber 40 and piston chamber 42 of front actuator 44 and, through supply lines 64, 66 and 46, 48, pressurizing rod chamber 50 and piston chamber 52 of rear actuator 54. This orientation causes the front and rear actuators 44, 54, respectively, to extend.

When valve 32 is actuated such that the spool is in the position shown in FIG. 1 (i.e., the unopened position), and valve 34 is actuated such that the spool is displaced from the configuration shown in FIG. 1 (i.e., the open position), pressurized fluid flows through supply lines 30, 70, to valve 34, and from valve 34 through line 64 and line 36 to the rod chamber 40 of front actuator 44 and through line 46 to the rod chamber 50 of rear actuator 54. At the same time, fluid in piston chambers 42, 52 of front and rear actuators 44, 54 flows through lines 38, 48, 66 to valve 34, and from valve 34 through return lines 68, 62 to the reservoir 16. Accordingly, the front and rear actuators 44, 54 are retracted.

Thus, by selectively pressurizing the front and rear actuators 44, 54 (which, for example, would both be mounted on one side of a vehicle) by appropriately opening and closing solenoid valves 32, 34, the associated vehicle may be leveled.

When the actuators 44, 54 receive a shock load, such as by actuator 72 (which schematically shows a test stand associated with the suspension system 10 that is designed to simulate a vehicle associated with the suspension system encountering a bump or bumps), the shock causes the pistons 74, 76 to be displaced relative to the cylinders 78, 80. The displacement is facilitated by check valves 82, 83 within the pistons 74, 76 of actuators 44, 54, respectively.

A disadvantage with such systems is that the shock imparted to the actuators 44, 54 is, in turn, transmitted to the associated supporting structure, such as a vehicle body, through bushings 84, 85 (or other actuator mountings), resulting in discomfort to passengers and possible damage to associated components.

In an effort to reduce the transmission of shock, such actuators have been modified as shown in FIG. 2. The actuator 86 shown in FIG. 2 includes a piston 87, a cylinder 88, a piston chamber 89, a rod chamber 90, an annular disk 91 and a piston rod 92. The piston 87 includes a plurality of orifices 93 therethrough that interconnect the piston chamber 89 with the rod chamber 90. The rigid, annular disk 91 extends about the piston rod 92 and is spring-biased (via spring 94) to cover the orifices 93 when the pressure in the piston chamber 89 and rod chamber 90 are equal and in conditions when the piston 87 and piston rod 92 are being forced out from the associated cylinder 88 of actuator 86. However, when a force, indicated by arrow F, is applied to piston rod 92, as by a shock load imparted to the actuator 86, thereby forcing piston 87 into cylinder 88, the flow of fluid from the piston chamber 89 to the rod chamber 90 through orifices 93 displaces the disk 91 away from the piston 87 (i.e., against the bias of spring 94), thereby facilitating the flow of fluid from the piston chamber 89 to the rod chamber 90. The presence of the disk 90 retards the flow of fluid and lessens the shock transmitted to the associated vehicle.

Nevertheless, a disadvantage with such actuators and systems is that there is noise associated with the rapid displacement of the piston 87 resulting from the flow of fluid around the annular disk 91 in response to a shock load and the aeration and compression of hydraulic fluid within the actuators. Accordingly, there is a need for an actuator for use in a suspension system in which the noise associated with rapid displacement of the actuator is minimized.

SUMMARY

One embodiment of the present invention is a linear actuator including a cylinder, a piston slidably received within the cylinder and defining a piston chamber in the cylinder and a rod chamber in the cylinder, a rod connected to the piston, a plurality of orifices defined within the piston, wherein the plurality of orifices interconnect the piston chamber and the rod chamber, and a sealing member mounted on the rod for movement between a closed position, wherein the sealing member generally blocks the flow of fluid through at least one of the plurality of orifices, and an open position, wherein the sealing member generally does not block the flow through the plurality of orifices. The plurality of orifices includes at least one always-open orifice that is not blocked by the sealing member when the sealing member is in the closed position According to a second embodiment of the present invention, the linear actuator includes a cylinder, a piston slidably received within the cylinder and defining a piston chamber in the cylinder and a rod chamber in the cylinder, a rod connected to the piston, a plurality of orifices defined within the piston, wherein the plurality of orifices fluidly couple the piston chamber to the rod chamber, and a sealing member mounted to the rod for movement between an open position, wherein the sealing member forms a gap between the piston and the sealing member to generally allow the flow of fluid between the piston chamber and the rod chamber, and a closed position, wherein the sealing member generally blocks the gap, thereby generally blocking the flow of fluid between the piston chamber and the rod chamber.

Accordingly, when the piston is forced into the cylinder, such as when a shock load is applied to the actuator, the flow of fluid from the piston chamber to the rod chamber deflects the sealing member such that the orifices extending through the piston gradually open and reduce sharp pressure increases within the piston and rod chambers. The always-open orifice (which may comprise or include a gap between the piston or rod chamber) provides an initial attenuation of the rate of pressure build-up in the piston chamber. Consequently, pressure spikes in the cylinder resulting from a shock load imparted to the actuator are reduced and the acceleration or shock load transmitted from the actuator to the vehicle or supporting structure is minimized.

A third embodiment of the present invention provides a hydraulic actuator system including an actuator having a cylinder, a piston slidably received within the cylinder and defining a piston chamber in the cylinder and a rod chamber in the cylinder, a rod connected to the piston, and a plurality of orifices defined within the piston, wherein the plurality of orifices interconnect the piston chamber and the rod chamber, a valve manifold in fluid communication with the piston chamber by a first fluid line and in fluid communication with the rod chamber by a second fluid line, and at least one restriction positioned on at least one of the first fluid line and the second fluid line.

Other objects and advantages of the invention will be apparent from the following description, the accompanying drawings and the appended claims.

DETAILED DESCRIPTION

Figure 5:
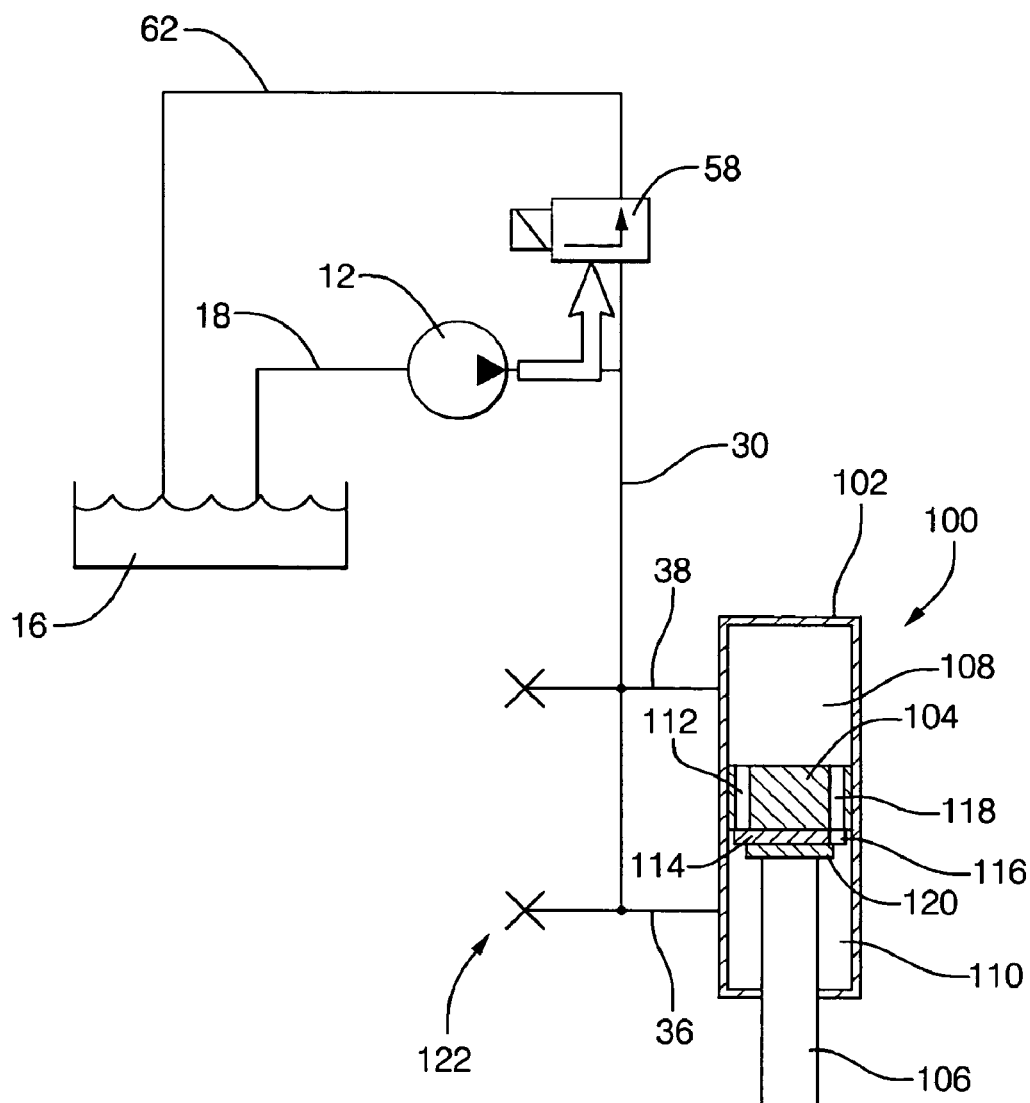
FIG. 5A is a front elevational view, shown in section, of an actuator according to one embodiment of the present invention.
FIG. 5B is a top plan view of a piston of the actuator of FIG. 5A.
Figure 5:
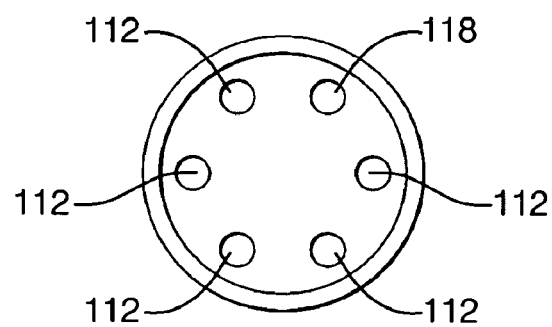

As shown in FIGS. 5A and 5B, the linear actuator of the present invention, generally designated 100, is of the type typically used in a dynamic body control system. Such systems typically utilize actuators 100 mounted between the wheel assembly and an associated torsion bar.

The actuator 100 includes a tube-shaped cylinder 102, a piston 104 slidably received within the cylinder 102 and a piston rod 106 connected to the piston 104. The piston 104 divides the cylinder into a piston chamber 108 and a rod chamber 110. The piston 104 includes a plurality of orifices 112, 118, each of which provides a passage between the piston chamber 108 and the rod chamber 110.

An annular, flexible, deflective disk 114 is mounted on the rod 106 adjacent to the piston 104. The disk 114 is shaped to cover the orifices 112 when pressed against the piston 104. The disk 114 includes an opening 116 that is aligned with one of the orifices 118 of the piston 104 and is urged against the piston 104 by a spring washer 120. The disk 114 is preferably made of steel, but may also be made of other materials (e.g., plastic, rubber, various metals, various polymeric materials and the like). Alternatively, the disk 114 may include more than one opening 116 such that more than one orifice 118 is aligned with the openings 116 in the disk.

Figure 1:
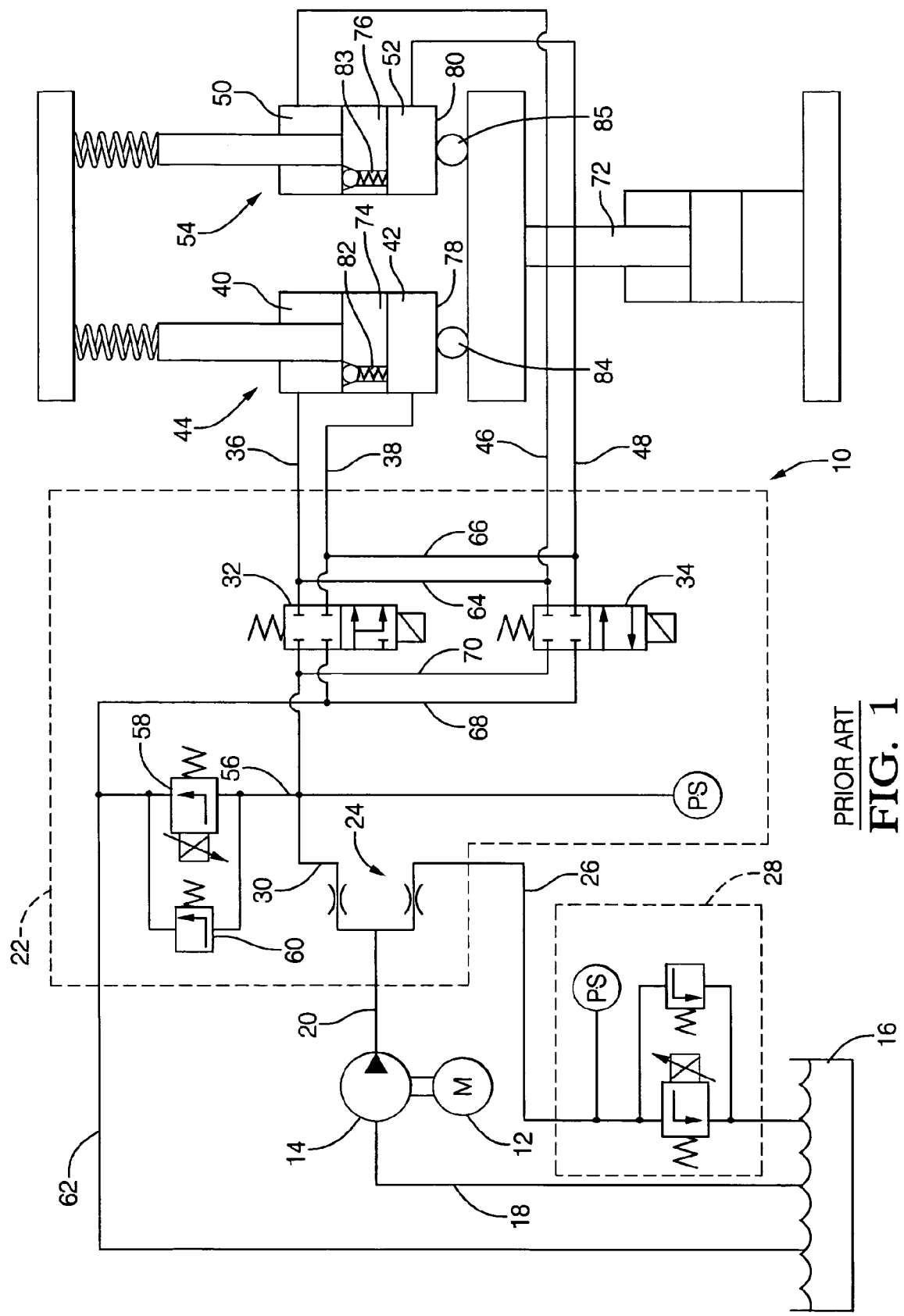
FIG. 1 is a schematic diagram showing a hydraulic system with prior art actuators.

The valve manifold 122 (which may be solenoid valves 32, 34, as shown in FIG. 1) connects the actuator 100 to the pump 12 through supply lines 30, 36, 38. Lines 36, 38 are connected to the rod chamber 110 and piston chamber 108, respectively.

Figure 10:
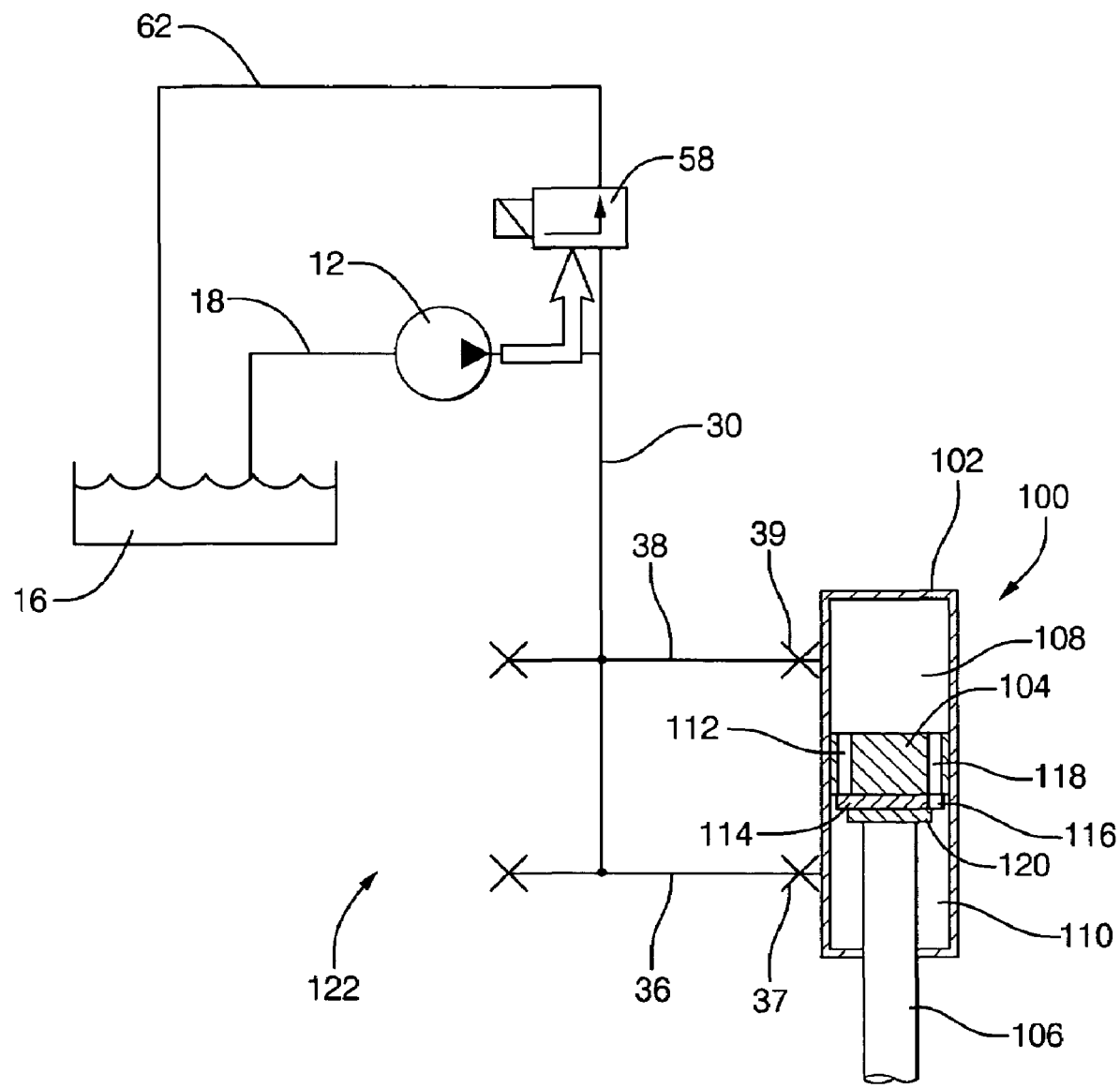
FIG. 10 is a front elevational view of the actuator of FIG. 5A having two restrictions.

As shown in FIG. 10, line 36 may include an orifice or restriction 37 for controlling the flow of hydraulic fluid to and from the rod chamber 110 via line 36. Line 38 may include an orifice or restriction 39 for controlling the flow of hydraulic fluid to and from the piston chamber 108 via line 38. According to one embodiment of the present invention, restriction 37 restricts the flow of hydraulic fluid from the rod chamber 110 and restriction 39 opens the flow of hydraulic fluid to the piston chamber 108. For example, restriction 37 may have an internal diameter of about 2 mm and restriction 39 may have an internal diameter of about 6.2 mm. According to a second embodiment of the present invention, restriction 37 opens the flow of hydraulic fluid to/from the rod chamber 110 and restriction 39 restricts the flow of hydraulic fluid to/from the piston chamber 108. For example, restriction 37 may have an internal diameter of about 2.5 mm and restriction 39 may have an internal diameter of about 1 mm. Accordingly, by adjusting the internal diameters of the restrictions 37, 39, the noise associated with rapid displacement of the piston 104 may be reduced.

Figure 2:
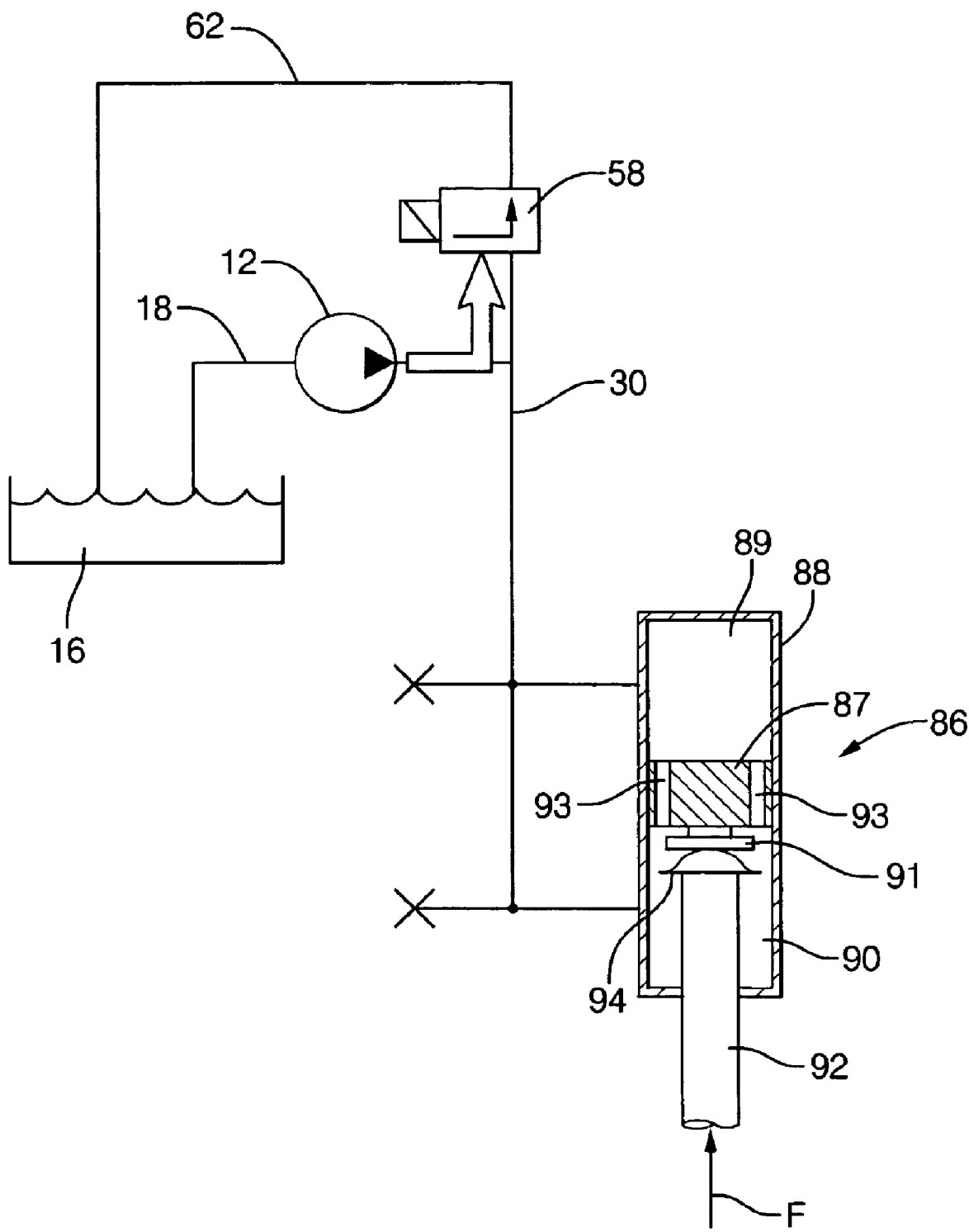
FIG. 2 is a schematic diagram of a prior art actuator having a rigid disk.
Figure 3:
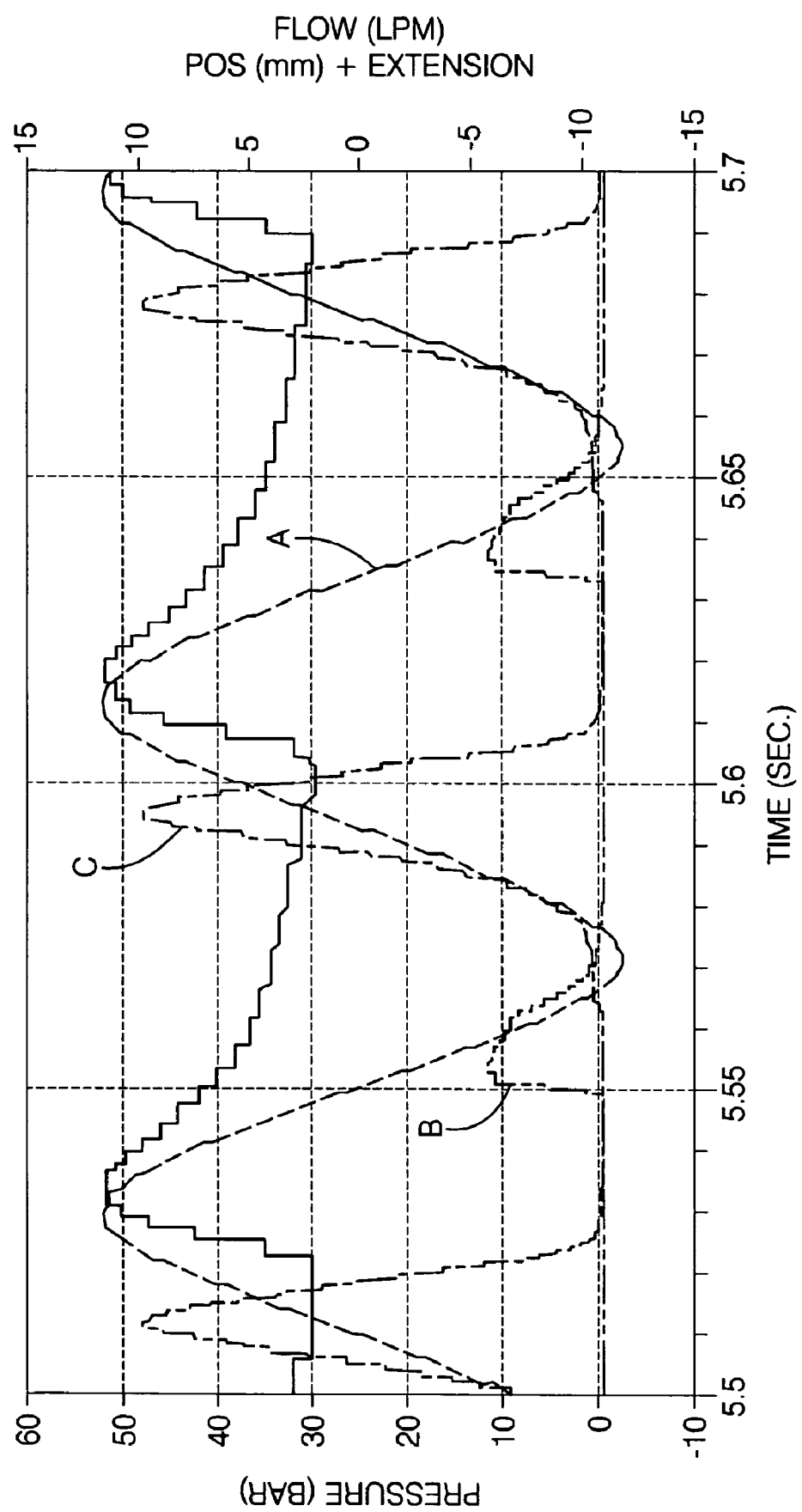
FIG. 3 is a graph showing pressure versus time and external shock loading versus time for a piston chamber and a rod chamber of the prior art actuator shown in FIG. 2.
Figure 4:
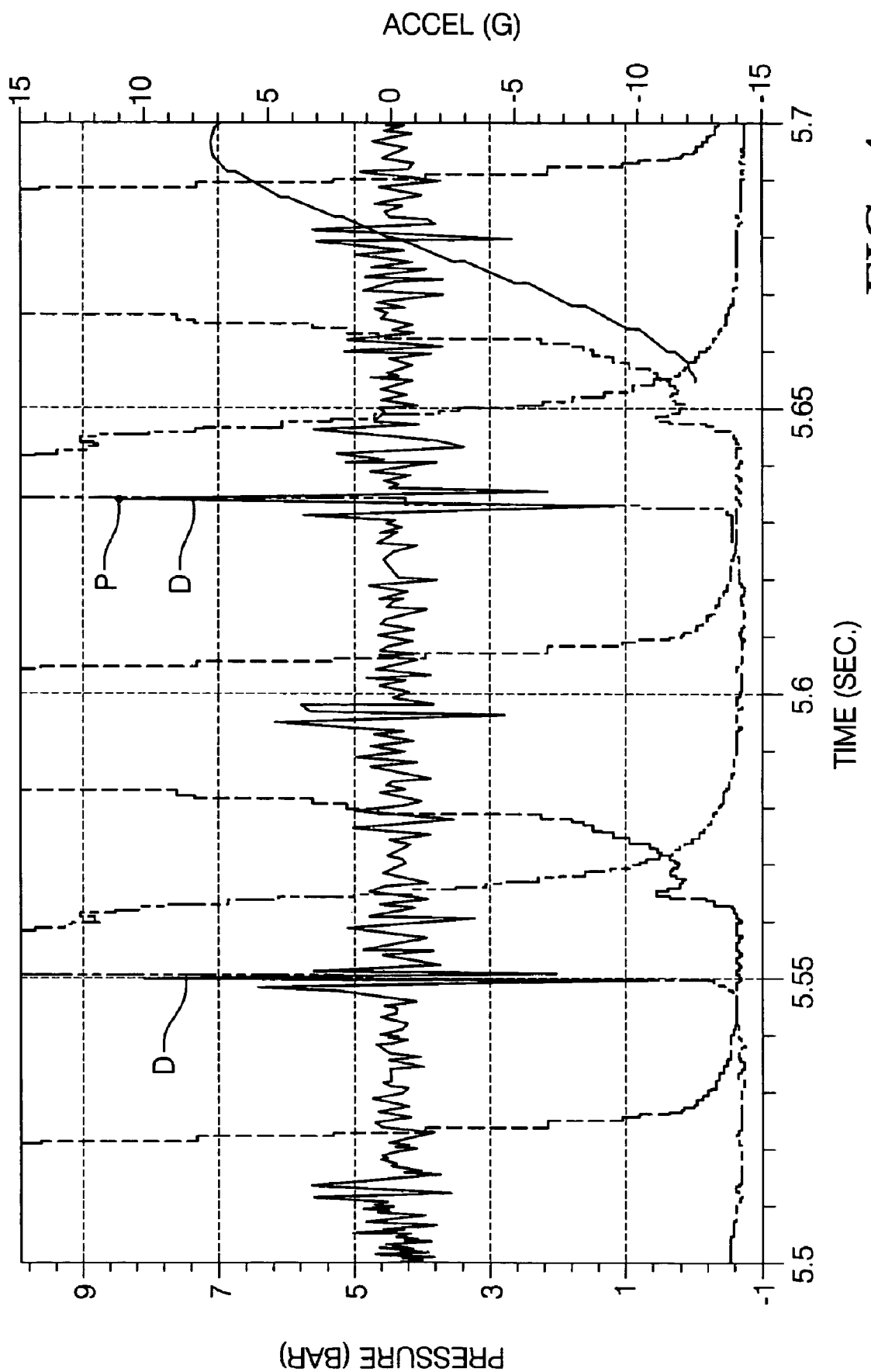
FIG. 4 is a graph of acceleration magnitude versus time for the prior art actuator shown in FIG. 2.

The advantage of the actuator 100 of the present invention over prior art actuator 86 (see FIG. 2) is shown graphically in FIGS. 3, 4, 6 and 7. In FIG. 3, the cyclical load applied to prior art actuator 86 is shown by line A. This load causes sharp pressure spikes in the piston chamber 89, shown by line B and in the rod chamber 90, shown by line C. As shown in FIG. 4, the acceleration that the actuator 86 transmits to the associated vehicle is shown by line D. As is apparent from FIG. 4, the magnitude of the acceleration, and hence the noise transmitted to the vehicle, is relatively high and coincides with the sharp transition in the pressure increase in the piston and rod chambers 89, 90, respectively.

Figure 6:
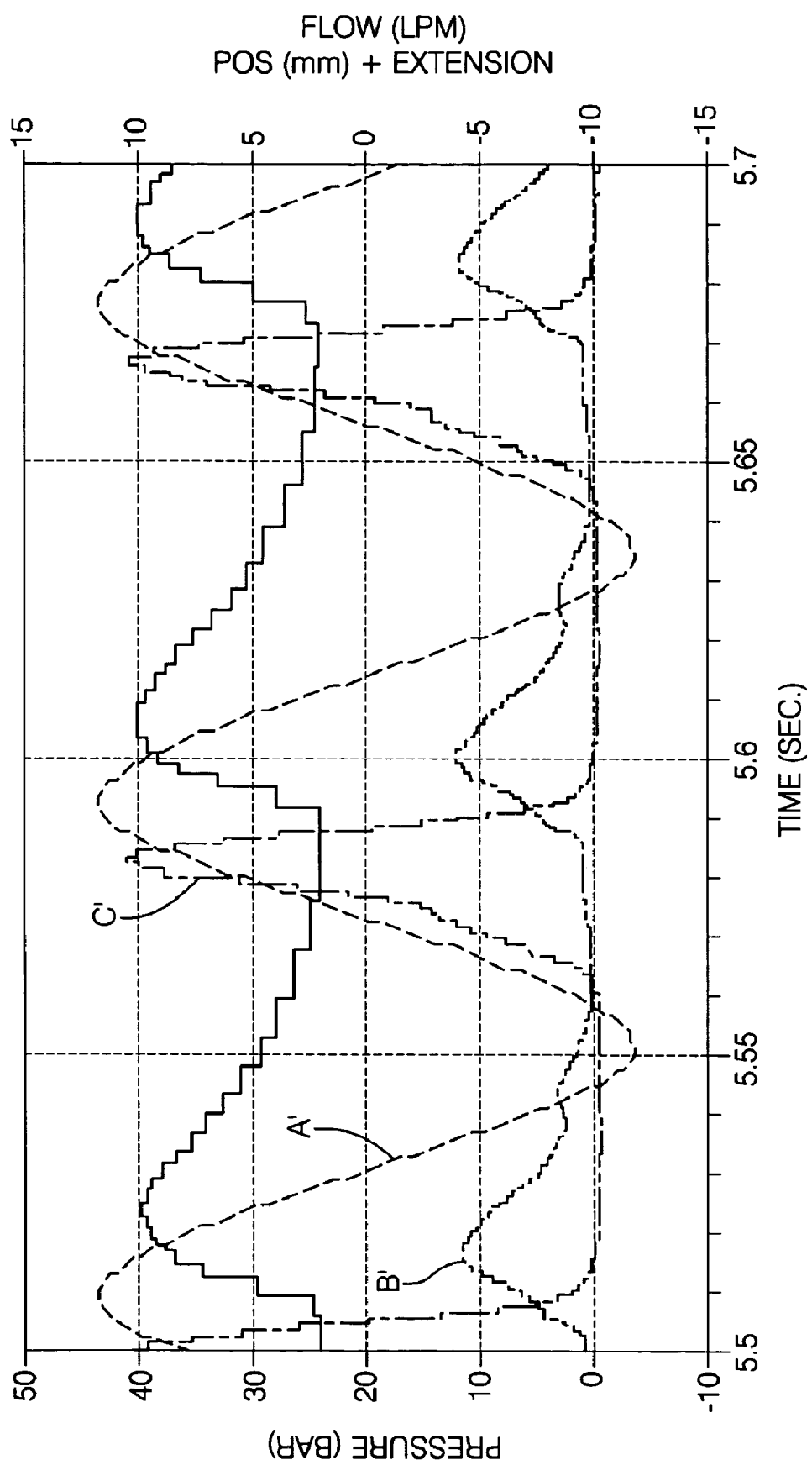
FIG. 6 is a graph showing pressure versus time and external shock loading versus time for a piston chamber and a rod chamber of the prior art actuator shown in FIG. 5A.
Figure 7:
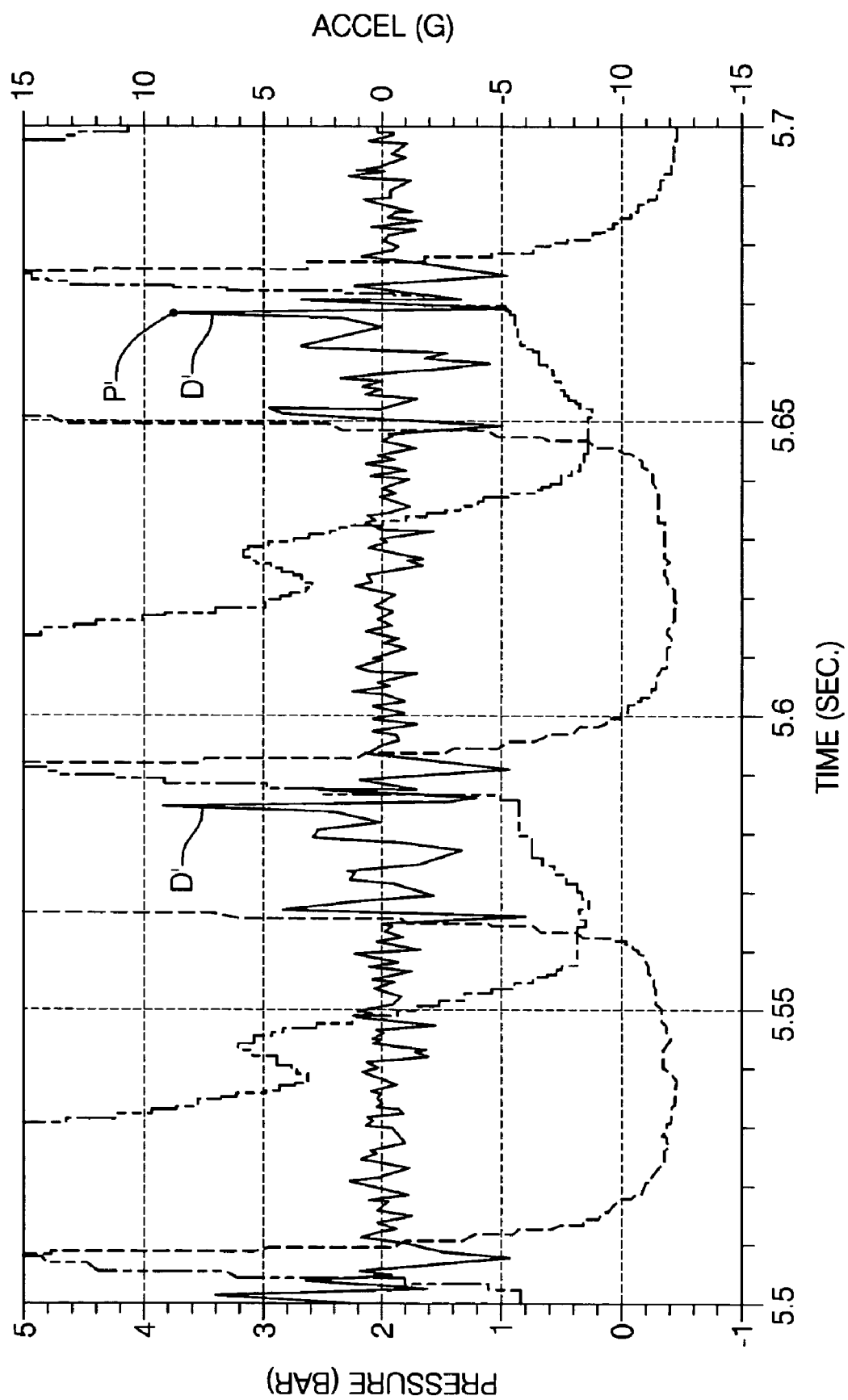
FIG. 7 is a graph of acceleration magnitude versus time for the actuator shown in FIG. 5A.

As shown in FIGS. 6 and 7, a similar cyclical load, shown by line A' in FIG. 6, is applied to the actuator 100 of the present invention and results in a much reduced pressure spike in the piston chamber 108, shown by line B', and in the rod chamber 110, shown by line C'. Furthermore, the transition from a low pressure state to the maximum pressure state is less sharp as a result of the behavior of the actuator 100 of the present invention, resulting in a reduced acceleration transmitted to the associated vehicle, as shown by line D' in FIG. 7. In fact, the high acceleration transmitted by the prior art actuator 86 to the vehicle, shown at point P in FIG. 4, is greatly reduced with the linear actuator 100 of the present invention as shown by point P' in FIG. 7.

While not limiting the invention to any particular theory, it is believed that the reason for this improved performance is that the flexible disk 114 (in contrast to the rigid disk 91 of the prior art shown in FIG. 2) effects a gradual opening of the orifices 112, 118 between the piston chamber 108 and rod chamber 110 in the actuator 100 in those instances in which the piston 104 is compressed in to the cylinder 102, since the flexible disk deforms or curls away gradually from the piston 104 in response to fluid flowing through orifices. Furthermore, since orifice 118 is aligned with opening 116, it is constantly open and is not blocked by disk 114 and thus provides a constant flow between piston chamber 108 and rod chamber 110, which also acts to reduce sharp transitions of pressure in the piston chamber 108 and reduces the pressure spike in the rod chamber 110 at the beginning of the transmission of a shock load to the actuator 100.

The size of the orifices 112, 118 will depend upon the relative sizes of the piston 104 and cylinder 102. The size of orifices 112, 118 should be selected such that the pressure drop across the piston 104 is at or between about 100 bar and about 85 bar during a typical compression movement of actuator 100. According to one embodiment, the pressure drop should be slightly greater than 100 bar during such a compression movement. Accordingly, while there may be some sacrifice in the performance of the actuator, the slight attenuation in performance is more than compensated by the decrease in noise and shock transmitted from the actuator 100 to the associate vehicle.

Figure 8:
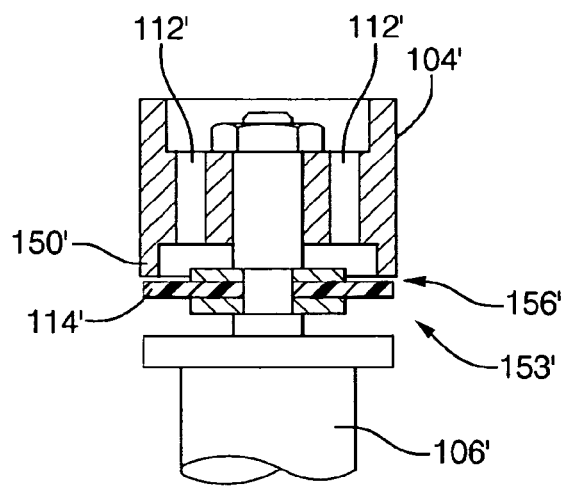
FIG. 8A is a front elevational view, shown in section, of a piston according to a second embodiment of the present invention.
FIG. 8B is a top plan view of the piston of FIG. 8A.
Figure 8:
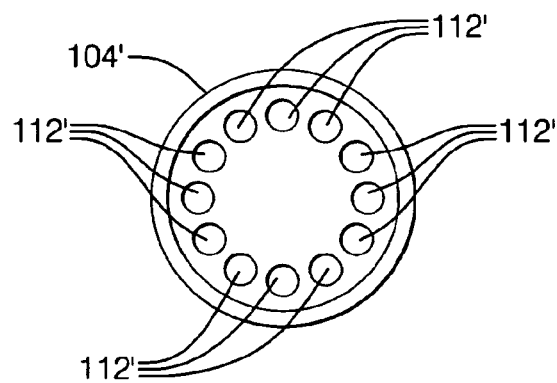

As shown in FIGS. 8A and 8B, an alternate embodiment of the present invention includes a piston 104' having a plurality of orifices 112' and an annular ridge 150' extending about the periphery of the piston 104' on the rod side 153' of the piston 104'. The deflective disk 114' is mounted on the rod 106' such that it forms a gap 156' with the ridge 150' that is normally open when the pressure differential between the piston chamber 108 and rod chamber 110 is less than a certain threshold pressure (e.g., 4 bar). However, if the pressure differential is greater than the threshold pressure (e.g., greater than about 4 bar), then the disk 114' is deflected against the ridge 150', thereby closing the gap 156'. For example, the gap 156' may close when the piston 104' is rapidly forced out of the cylinder 102. When the piston 104' is rapidly forced into the cylinder 102, the disk 114' may deflect away from the piston 104', thereby opening the gap 156' from its original position (i.e., expanding the gap 156').

Figure 9:
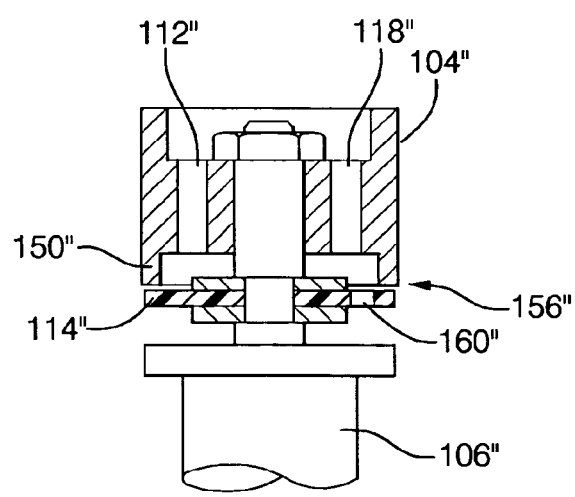
FIG. 9A is a front elevational view, shown in section, of a piston according to a third embodiment of the present invention.
FIG. 9B is a top plan view of the piston of FIG. 9A.
Figure 9:
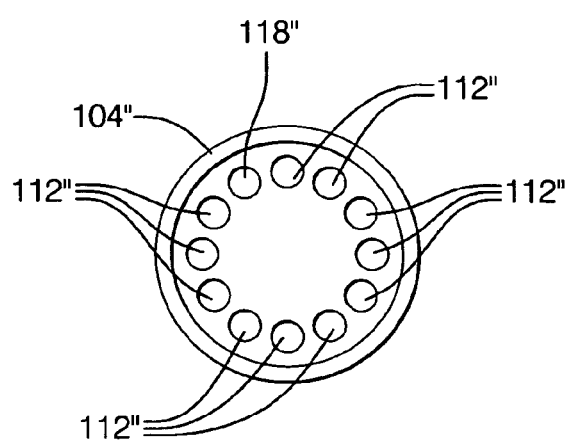

As shown in FIGS. 9A and 9B, an alternate embodiment of the invention includes a piston 104" having a plurality of orifices 112", 118" and an annular ridge 150". A disk 114" is mounted on the rod 106" to form a gap 156" between the disk 114" and the piston 104". The disk 114" has one opening or orifice 160" extending therethrough which acts as a constant bypass to allow fluid to flow across the disk 114" even when the disk is deflected against the ridge 150". The orifice 160" may align with an orifice 118" in the piston 104" to facilitate fluid flow. A disk 114" having more than one orifice 160" is within the scope of the present invention.

Although the invention is shown and described with respect to certain embodiments, it is obvious that equivalents and modifications will occur to those skilled in the art upon reading and understanding the specification. The present invention includes all such equivalents and modifications and is limited only by the scope of the claims.

What is claimed is:

1. A linear actuator comprising:
   a cylinder;
   a piston slidably received within said cylinder and defining a piston chamber and a rod chamber in said cylinder;
   a rod connected to said piston;
   said piston having a plurality of orifices therethrough such that said piston chamber and said rod chamber are in fluid communication; and
   a sealing member mounted on said rod for movement between a closed position, wherein said sealing member substantially blocks fluid flow through at least one of said plurality of orifices, and an open position wherein said sealing member generally does not block fluid flow through said at least one of said plurality of orifices, wherein said plurality of orifices includes at least one always-open orifice that is not blocked by said sealing member when said sealing member is in said closed position and wherein said sealing member includes at least one opening that is generally aligned with said at least one always-open orifice.

2. The linear actuator of claim 1 wherein said sealing member is shaped such that when in said open position, said sealing member does not block the flow through any of said plurality of orifices.

3. The linear actuator of claim 1 wherein said sealing member includes a deflective disk.

4. The linear actuator of claim 3 wherein said deflective disk is made from a material selected from the group consisting of steel, rubber, polymeric material and metal.

5. The linear actuator of claim 3 wherein said deflective disk is mounted on said rod and against said piston.

6. The linear actuator of claim 5 wherein said deflective disk is sufficiently flexible such that, when adjusted to said open position, a gradual deformation or curling away of said disk occurs in response to fluid flow between said piston chamber and said rod chamber.

7. The linear actuator of claim 1 wherein said orifices are sized such that a pressure drop across said piston during a compression movement is between about 100 bar and about 85 bar.

8. The linear actuator of claim 1 wherein said piston includes a single always-open orifice and said sealing member is shaped such that, when in said closed position, said sealing member blocks fluid flow through each of said plurality of orifices except for said single always-open orifice.

9. The linear actuator of claim 1 wherein said piston is shaped to from a seal with an inner wall of said cylinder.

10. The linear actuator of claim 1 wherein said rod is generally axially aligned with said cylinder and said piston and at least a portion of said rod is located outside of said cylinder.

11. The linear actuator of claim 1 further comprising a hydraulic fluid located in said piston chamber and said rod chamber, wherein movement of said piston in said cylinder causes fluid to flow from one of said piston chamber or said rod chamber to the other one of said piston chamber or said rod chamber through said plurality of orifices.

12. A linear actuator comprising:
   a cylinder;
   a piston slidably received within said cylinder and defining a piston chamber and a rod chamber in said cylinder;
   a rod connected to said piston;

said piston having a plurality of orifices therethrough such that said piston chamber and said rod chamber are in fluid communication, wherein at least one of said plurality of orifices is an always-open orifice; and a sealing member mounted on said rod for movement between an open position, wherein said sealing member forms a gap between said piston and said sealing member to allow a flow of fluid between said piston chamber and said rod chamber, and a closed position, wherein said sealing member substantially blocks said gap, thereby substantially blocking fluid flow between said piston chamber and said rod chamber, said sealing member including at least one opening that is generally aligned with said at least one always-open orifice.

13. The linear actuator of claim 12 wherein said sealing member includes a deflective disk.

14. The linear actuator of claim 13 wherein said deflective disk is made from a material selected from the group consisting of steel, rubber, polymeric material and metal.

15. The linear actuator of claim 12 wherein said piston includes an annular ridge and said gap is formed between said sealing member and said annular ridge.

16. The linear actuator of claim 12 wherein said sealing member is in said open position when a pressure drop across said piston is less than about 4 bar.

17. The linear actuator of claim 12 wherein said sealing member is normally in said open position.

18. A hydraulic actuator system comprising:
an actuator having:
a cylinder,
a piston slidably received within said cylinder and defining a piston chamber in said cylinder and a rod chamber in said cylinder,
a rod connected to said piston, and
a plurality of orifices defined within said piston, wherein said plurality of orifices fluidly couple said piston chamber to said rod chamber;
a valve manifold in fluid communication with said piston chamber by a first fluid line and said rod chamber by a second fluid line;
at least one restriction positioned on at least one of said first fluid line and said second fluid line; and
a sealing member mounted on said rod for movement between a closed position, wherein said sealing member reduces fluid flow through at least one of said plurality of orifices, and an open position wherein said sealing member is relatively less restrictive of fluid flow through said at least one of said plurality of orifices, and wherein said plurality of orifices includes at least one always-open orifice that is not blocked by said sealing member when said sealing member is in said closed position.

19. The hydraulic actuator system of claim 18 wherein said first fluid line includes at least one of said restrictions and said second fluid line includes at least one of said restrictions.

20. The hydraulic actuator system of claim 19 wherein said restriction on said first fluid line opens fluid flow between said piston chamber and said valve manifold and said restriction on said second fluid line restricts fluid flow between said rod chamber and said valve manifold.

21. The hydraulic actuator system of claim 20 wherein said restriction on said first fluid line has an internal diameter of about 6.2 mm and said restriction on said second fluid line has an internal diameter of about 2 mm.

22. The hydraulic actuator system of claim 19 wherein said restriction on said first fluid line restricts fluid flow between said piston chamber and said valve manifold and said restriction on said second fluid line opens fluid flow between said rod chamber and said valve manifold.

23. The hydraulic actuator system of claim 22 wherein said restriction on said first fluid line has an internal diameter of about 1 mm and said restriction on said second fluid line has an internal diameter of about 2.5 mm.

* * * * *